April 7, 1959  H. WEIGOLD ET AL  2,880,459
TIRE SHAPING AND CURING PRESSES
Filed Oct. 10, 1957  2 Sheets-Sheet 1

INVENTOR.
HAROLD WEIGOLD
BY ARTHUR W. GRANT
Irwin M. Lewis
ATTORNEY.

INVENTOR.
HAROLD WEIGOLD
BY ARTHUR W. GRANT

ATTORNEY.

United States Patent Office 2,880,459
Patented Apr. 7, 1959

2,880,459
TIRE SHAPING AND CURING PRESSES

Harold Weigold, Grosse Pointe Park, and Arthur W. Grant, Detroit, Mich., assignors to United States Rubber Company, New York, N.Y., a corporation of New Jersey Application October 10, 1957, Serial No. 689,364

3 Claims. (Cl. 18—17)

This invention relates to tire shaping and curing presses of the diaphragm type and in particular to those portions of the mold structure thereof which shape and form the bead regions of the tire. Such portions of the mold structure are commonly in the form of removable rings which are referred to as toe rings or bead curing rings. When curing tires of the same size, but constructed of different materials of varying bulk, it has been necessarily to compensate for the resulting variation in bead thicknesses or bead width by one of two methods.

The first of these methods is to modify the tire carcass construction in the bead area by adding extra stock to the thinner, less bulky material to thereby increase the bead thickness to correspond with the width of the bead ledge or the toe ring against which the bead is forced to shape the base of the bead during molding. This is both expensive and relatively unsatisfactory. The second method is to provide a plurality of toe rings with various ledge widths so that toe rings with a particular ledge width may be selected for forming a tire having a particular bead thickness. In following this method, as many as four to seven different sets of toe rings may be necessary to cover the range of variations in bead thickness.

The primary object of the present invention is to provide a mold structure for a diaphragm type tire press which will accommodate tires of various bead thickness without the necessity of adding stock to the beads or changing the toe rings of the mold.

In accordance with the invention this object is obtained by providing narrow annular lips on the inner surfaces of the mold which form extensions of the bead base forming ledges of the mold. When the press is in operation, these lips penetrate the diaphragm an amount sufficient to compensate for differences in the widths of the tire beads and the base forming ledges of the mold so that the beads are properly formed.

Other objects and advantages of the invention will become apparent from the following description when read in conjunction with accompanying drawings, wherein.

Figure 3:
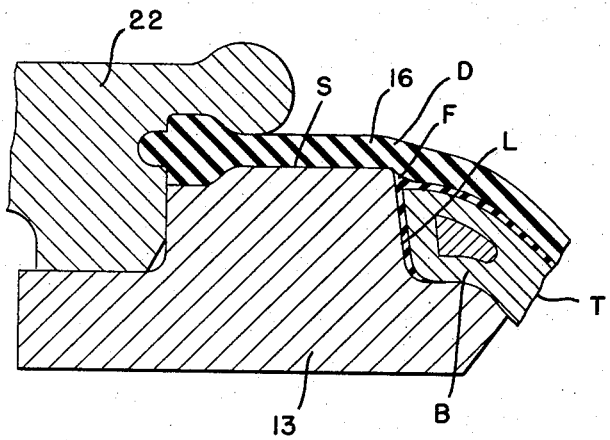
Fig. 3 is a sectional view of a portion of a mold incorporating a conventional toe ring showing how an objectionable flash is formed at the toe of the bead when a tire having a bead of less width than the ledge is molded therein.
Figure 4:
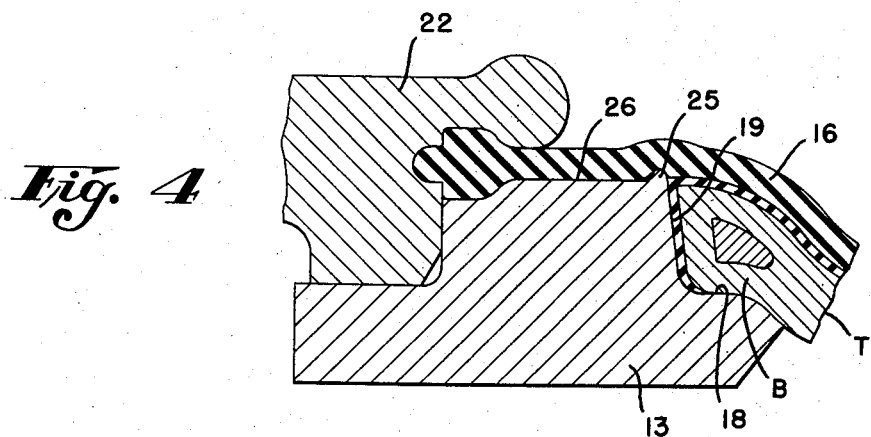
Figure 5:
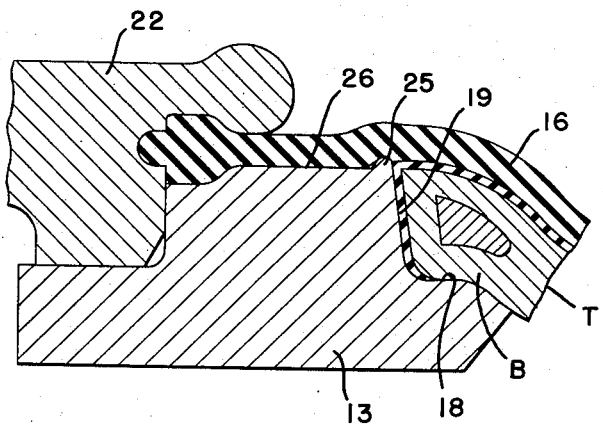

Fig. 4 is a sectional view similar to that of Fig. 3 but showing a toe ring incorporating an annular lip in accordance with the present invention which penetrates locally into the diaphragm an amount sufficient to compensate for the difference in width between the tire bead and ledge to thereby prevent the formation of objectionable flash on the toe of the bead, and Fig. 5 is a sectional view similar to that of Fig. 4, but showing the mold structure used in forming a bead of slightly greater width than that shown in Fig. 4.

Figure 1:
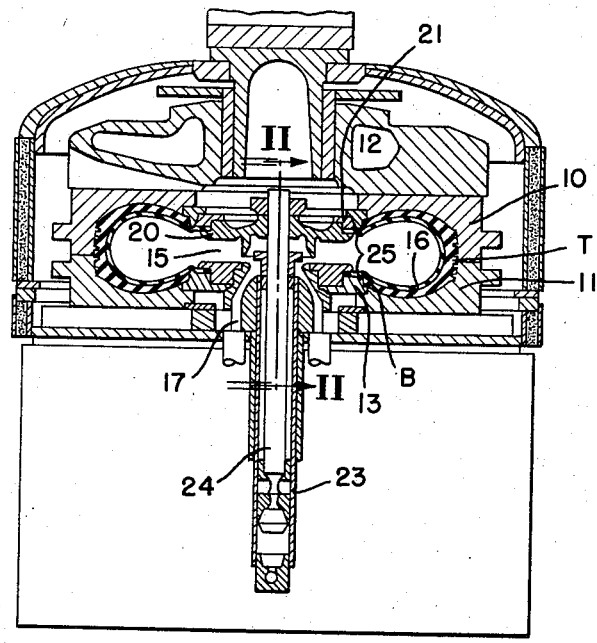
Fig. 1 is a sectional view of a conventional diaphragm type tire press incorporating mold structure modified in accordance with the present invention by the addition of annular lips forming extensions of the bead forming ledges of the toe rings.

In Fig. 1 there is shown a conventional diaphragm type tire press. The particular tire press shown is the type sold by the McNeil Machine and Engineering Company under the trademark "Bag-O-Matic." A tire press of this general type is shown and described in U. S. Patent No. 2,296,800. In the drawing, the press is shown closed with a tire T being shaped and molded therein.

The mold structure of the press in which the tire is shaped and vulcanized includes two mold halves 10 and 11 and toe rings 12 and 13. When the mold halves are closed as shown in Fig. 1, the mold has a continuous opening 15 at its inner periphery which communicates with the interior of the mold cavity and through which the flexible bladder or diaphragm 16 of the press extends. Steam or hot water under pressure is admitted to the interior of the diaphragm through passageway 17 to press the tire T against the inner surface of the mold structure to thereby shape and vulcanize the tire to the desired configuration. The major portion of the tire is formed against the interior surface of the mold halves 10 and 11. The bead portions B of the tire T are formed against surfaces 18 and 19 of the toe rings 12 and 13. Surfaces 19 against which the bases of the beads are formed are commonly referred to as the bead ledges.

The diaphragm 16 which is formed of flexible reinforced rubber, is secured at one end to an upper movable platen 20 by a clamping ring 21 and is secured to a lower stationary platen 22 by lower toe ring 13. Upper toe ring 12 is secured to the upper mold half 10 and is movable therewith. The lower mold half 11 is stationary. To remove a vulcanized tire from the press, the upper mold half 10 with toe ring 12 attached thereto, is moved upwardly and away from the lower mold half 11 by a suitable mechanism (not shown). The upper platen 20 is moved upwardly by the introduction of fluid under pressure to a cylinder 23. The upper platen 20 is secured to the outer end of the piston rod 24 of the cylinder 23. As the upper platen 20 moves upwardly it pulls the diaphragm 16 from within the vulcanized tire until the diaphragm is elongated to the extent that it has an outer diameter less than that of the inner bead diameter of the tire. The tire is then lifted up from around the diaphragm and removed from the press.

Figure 2:
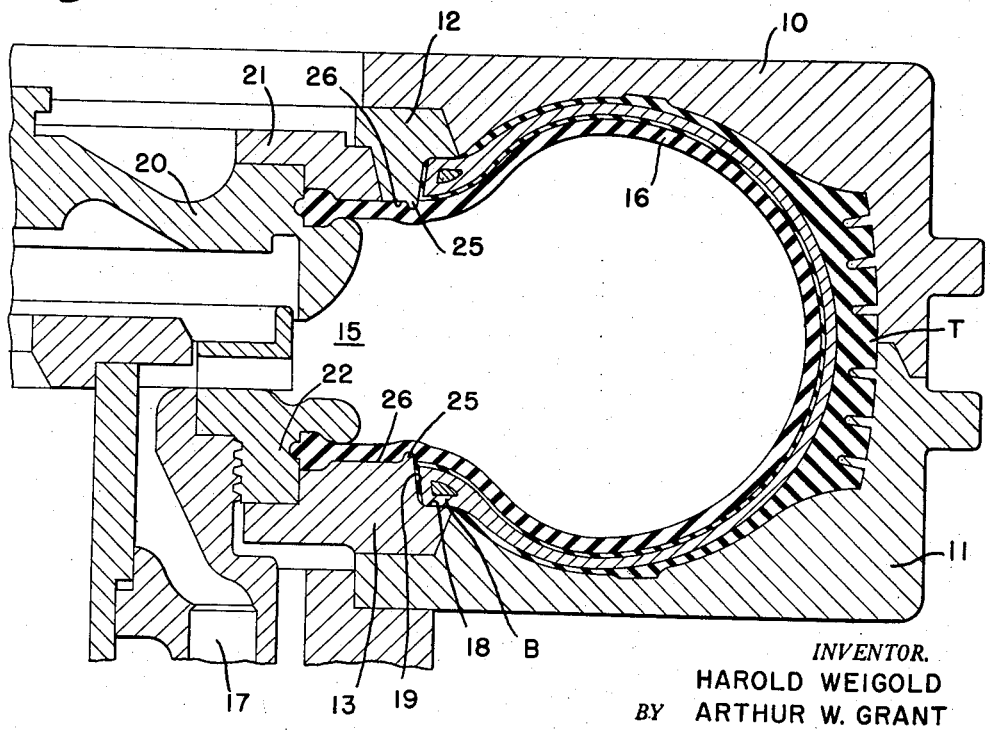
Fig. 2 is an enlarged sectional view taken on the line II—II of Fig. 1 showing one of the annular lips in greater detail and showing the local penetration thereof into the diaphragm during vulcanizing of a tire.

In accordance with the present invention, each of the toe rings 12 and 13 is provided with an annular inwardly extending lip 25, the outer surface of which forms an extension of the ledge surface 19. When the press is in operation, the lips 25 penetrate into the diaphragm 16, as shown in Fig. 2, so that the material of the diaphragm occupies any excess surface of the ledge 19 not occupied by the bead B. Accordingly, no space is left in which flash may form. This is in contrast to the use of conventional toe rings. A conventional toe ring, as shown in Fig. 3, has no lip on the inner surface S and when the bead of the tire has a thickness substantially less than the width of the ledge surface L, the diaphragm D bridges across from the edge of the toe ring to the tire leaving a space into which objectionable flash of rubber F is formed.

As shown in Figs. 2, 4 and 5, the provision of the lips 25 permits the molding of tires having various bead widths without the formation of an objectionable flash of rubber at the toe of the bead. Preferably the lips 25 are rounded at their outer extremities to prevent their cutting into the diaphragm. Good results have been obtained using lips rounded to a radius of 1/64 of an inch at the outer extremities and extending outwardly from the inner surfaces 26 of the toe rings a distance of approximately .200 inch. Best results are obtained if the lips 25 penetrate the diaphragm at least .050 inch during molding and to this end it is desirable that the beads of a tire being vulcanized do not extend out on the lips 25 a greater distance than .050 inch from the outer extremities of the lips. It is also desirable for best results that the minimum thickness of the beads of the tires to be vulcanized are such that the toes thereof extend to at least within .050 inch of the surfaces 26. Thus for optimum results, toe rings having lips 25 projecting .200 inch from the surfaces 26 would accommodate tires having a maximum variation in bead width of 0.200 inch. In using conventional toe rings, at least four sets of toe rings would be necessary to cover this variation in width.

From the above description it can be seen that there is provided a mold structure for a diaphragm type tire press which will accommodate tires of various bead thicknesses without the necessity of adding stock to the beads or changing the toe rings. While the invention has been described in connection with the modification of conventional, removable toe rings, it will be appreciated that the toe rings with the lips 20 could be made an integral part of the mold, as the desirability of separate toe rings is partially obviated by the instant invention.

Having thus described our invention, what we claim and desire to protect by Letters Patent is:

1. In a tire mold of a type having a circumferentially continuous opening at its inner periphery communicating with the interior of the mold cavity through which the diaphragm of a diaphragm type tire press can extend and having opposed surfaces forming the opposite walls of said opening against which inner portions of the diaphragm can engage, and ledges extending outwardly from said surfaces against which the bases of the beads of the tire can be formed, the improvement comprising a circumferentially continuous, comparatively narrow lip projecting from each of said opposed surfaces and forming extensions of said ledges whereby said diaphragm when pressed against said opposed surfaces will be locally penetrated by said lips, and the material of said diaphragm will extend onto said ledges to occupy any space not occupied by the bead portions of the tire.

2. The apparatus as in claim 1, in which at least a portion of said opposed surfaces, said ledges and said lips are formed on separate ring members which are clamped to the remaining mold structure.

3. A toe ring for a mold of a type for use in a diaphragm type tire press comprising an annular member having a shoulder formed in its outer periphery, said shoulder providing angularly disposed surfaces for forming the base and outer sides of the bead of a tire, and an annular circumferentially continuous, comparatively narrow lip extending outwardly from the surface of one side of said annular member and forming an extension of said surface for forming the base of the bead.

References Cited in the file of this patent

UNITED STATES PATENTS

| | | |
|---|---|---|
| 2,559,119 | Frank | July 3, 1951 |
| 2,775,789 | Soderquist | Jan. 1, 1957 |